(12) United States Patent
Mihic

(10) Patent No.: US 8,240,961 B2
(45) Date of Patent: Aug. 14, 2012

(54) TOOL HOLDER WITH VIBRATION DAMPING MEANS AND A METHOD FOR MANUFACTURING THE SAME

(75) Inventor: Peter Mihic, Gävle (SE)

(73) Assignee: Mircona AB, Gavle (SE)

( * ) Notice: Subject to any disclaimer, the term of this patent is extended or adjusted under 35 U.S.C. 154(b) by 488 days.

(21) Appl. No.: 11/579,824

(22) PCT Filed: May 6, 2005

(86) PCT No.: PCT/SE2005/000668
§ 371 (c)(1),
(2), (4) Date: Dec. 22, 2006

(87) PCT Pub. No.: WO2005/107982
PCT Pub. Date: Nov. 17, 2005

(65) Prior Publication Data
US 2008/0025805 A1    Jan. 31, 2008

(30) Foreign Application Priority Data
May 7, 2004    (SE) ........................................ 0401187

(51) Int. Cl.
B23B 29/00    (2006.01)
B23B 27/00    (2006.01)
C23C 14/06    (2006.01)
(52) U.S. Cl. ............................ 408/143; 409/141; 82/163
(58) Field of Classification Search ................... 82/173, 82/158, 163, 904; 409/141; 408/143; 267/137
See application file for complete search history.

(56) References Cited

U.S. PATENT DOCUMENTS 2,310,409 A * 2/1943 Ellman .......................... 433/117
2,426,359 A   8/1947 Lankheet
(Continued)

FOREIGN PATENT DOCUMENTS
DE        19948891        4/2001
(Continued)

OTHER PUBLICATIONS

Database WPI, Week 197725, Derwent Publications Ltd., London, G8; Class P54, AN 1977-F2088Y (IENG MECH ENG COLI), Dec. 26, 1976 abstract.

(Continued)

Primary Examiner — Boyer D Ashley
Assistant Examiner — Sara Addisu
(74) Attorney, Agent, or Firm — Ware, Fressola, Van Der Sluys & Adolphson LLP

(57) ABSTRACT

A tool holder 1 has a shaft 2 intended to be arranged in a tool holder in a manufacturing machine, a head 3 on which a cutter is intended to be arranged and a vibration-damping material 4 arranged between, and attached to, the shaft 2 and the head 3 such that the cutter is in contact with the manufacturing machine solely through the vibration-damping material 4, where the vibration-damping material is a metal or an alloy of metals selected from the group consisting of Cu, Ti, Zn, Al and Ni. A method for manufacturing a tool holder in which the surface covering of vibration-damping material is created by electrochemical pulse plating through the tool holder, when functioning as an electrode, being lowered into an electrolyte containing ions of at least one metal selected from the group consisting of Cu, Ti, Zn, Al and Ni.

13 Claims, 1 Drawing Sheet

U.S. PATENT DOCUMENTS

| | | | |
|---|---|---|---|
| 2,535,398 A | | 12/1950 | Economous |
| 2,563,559 A | * | 8/1951 | Ingolf .............................. 83/835 |
| 2,606,366 A | * | 8/1952 | Stevens ......................... 433/166 |
| 2,699,696 A | * | 1/1955 | Hahn ............................. 408/143 |
| 2,842,014 A | * | 7/1958 | Miller ............................ 408/144 |
| 2,928,757 A | * | 3/1960 | Lee et al. ...................... 148/527 |
| 3,292,237 A | | 12/1966 | Fisher |
| 3,463,048 A | * | 8/1969 | Owsen .......................... 409/141 |
| 3,662,855 A | * | 5/1972 | Adams et al. ................. 181/207 |
| 3,663,116 A | * | 5/1972 | Muller et al. ................. 408/143 |
| 3,774,730 A | * | 11/1973 | Maddux ........................ 188/379 |
| 3,774,731 A | * | 11/1973 | Zerb .............................. 188/268 |
| 3,783,970 A | * | 1/1974 | Danielson ..................... 181/207 |
| 3,842,942 A | * | 10/1974 | Jensen et al. ................. 181/207 |
| 3,848,931 A | * | 11/1974 | Swisher ........................ 299/100 |
| 4,068,742 A | * | 1/1978 | Resare ....................... 188/322.5 |
| 4,353,433 A | * | 10/1982 | Mohrenstein-Ertel et al. .............................. 181/207 |
| 4,410,825 A | | 10/1983 | Lobastov |
| 4,516,658 A | * | 5/1985 | Scarton et al. ................ 181/208 |
| 4,553,884 A | * | 11/1985 | Fitzgerald et al. ............ 408/143 |
| 4,616,738 A | * | 10/1986 | Shurtliff ........................ 188/380 |
| 4,706,788 A | * | 11/1987 | Inman et al. .................. 188/378 |
| 4,759,428 A | | 7/1988 | Seshimo |
| 4,871,286 A | * | 10/1989 | Hunt .............................. 408/144 |
| 4,887,528 A | * | 12/1989 | Ruge et al. .................... 101/148 |
| 4,979,821 A | * | 12/1990 | Schutt et al. .................. 356/246 |
| 4,998,851 A | * | 3/1991 | Hunt .............................. 408/143 |
| 5,033,340 A | | 7/1991 | Siefring |
| 5,259,709 A | * | 11/1993 | Hunt .............................. 409/234 |
| 5,413,318 A | * | 5/1995 | Andreassen ................... 267/140 |
| 5,419,371 A | | 5/1995 | Berchem |
| 5,784,273 A | | 7/1998 | Madhavan |
| 5,869,798 A | * | 2/1999 | Ryu et al. ..................... 219/76.13 |
| 6,076,999 A | | 6/2000 | Hedberg et al. |
| 6,345,942 B1 | * | 2/2002 | Cook .............................. 409/131 |
| 6,925,915 B1 | * | 8/2005 | Claesson et al. ................ 82/133 |
| 6,929,431 B2 | * | 8/2005 | Bergholt et al. ............... 408/143 |
| 2007/0228879 A1 | * | 10/2007 | Imai et al. ................. 310/323.01 |
| 2008/0019782 A1 | * | 1/2008 | Imai et al. ........................ 407/11 |

FOREIGN PATENT DOCUMENTS

| | | |
|---|---|---|
| EP | 0 663 542 A1 | 7/1995 |
| EP | 1 266 710 A1 | 12/2002 |
| JP | 04 304907 | 10/1992 |
| JP | 2279329 | 7/1997 |
| JP | 2000 317703 | 11/2000 |
| JP | 2002 154003 | 5/2002 |
| JP | 2002233911 | 8/2002 |
| JP | 200362758 | 3/2003 |
| JP | 2004202649 | 7/2004 |
| RU | 536890 | 11/1976 |
| RU | 2028876 C1 | 12/1995 |
| SU | 536890 | 12/1976 |
| SU | 559779 | 6/1977 |
| SU | 810387 | 3/1981 |
| WO | 96/21113 | 11/1996 |
| WO | 00/76702 | 12/2000 |
| WO | 02/45892 | 6/2002 |
| WO | WO 2007114034 A1 * | 10/2007 |

OTHER PUBLICATIONS

Database WPI, Week 197807, Derwent Publications Ltd., London, GB; Class P54, AN 1978-B4449A (LENGD Mechanic INST), Jun. 30, 1977 abstract.

Database WPI, Week. 198149, Derwent Publications Ltd., London, G8; Class P54, AN 1981-M6314D (IRKUT Poly), Mar. 10, 1981 abstract; figure 1.

Database WPI, Week 199735, Derwent Publications Ltd., London, GB; Class M13, AN 1991-003001 (Tanaka Kikinzoku Kogyo KK), Jul. 30, 1997 abstract.

Database WPI, Week 200367, Derwent Publications Ltd., London, G8; Class ASS, AN 2003-700165 (ENOMOTO KK), Mar. 5, 2003 abstract.

Patent Abstracts of Japan, vol. 2002, No. 12, Dec. 12, 2002.

Patent Abstracts of Japan, vol. 2003, No. 12, Dec. 5, 2003.

Fastov, Y.K. et al, "Alloys with high damping properties", Moscow, Metallugry, 1973, pp. 30, 31, totally—3 pages.

Polytechnic dictionary, Second edition, Moscow, Soviet encyclopedia, 1980, p. 106, 613, totally—3 pages.

"Electroplating coatings in machinery", Reference book, Moscow, "Machinery", vol. 1, pp. 2, 3, totally—3 pages, 1985.

"Electroplating coatings in machinery", Reference book, Moscow, "Machinery", vol. 2, p. 185, totally—2 pages, 1985.

* cited by examiner

TOOL HOLDER WITH VIBRATION DAMPING MEANS AND A METHOD FOR MANUFACTURING THE SAME

TECHNICAL AREA

The present invention relates to a tool holder and a method for manufacturing the same.

BACKGROUND TO THE INVENTION

Tool holders in manufacturing machines have a tendency to vibrate and give rise to noise when in use. Such vibration disturbs the work process by having a negative effect on the accuracy of the result. The vibrations also give rise to a troublesome disturbing noise that worsens the environment around the manufacturing machine.

A perfect manufacturing machine does not give rise to any vibrations, and all energy is passed to the process that is to be carried out. In practice, vibrations always arise when the various parts of the machine work against each other. As the machine becomes more and more worn, changes in its dynamic properties take place. This means that new types of vibration can arise during different periods of the lifetime of the machine. The vibrations can lead to poor surface finish of the work piece, further wear on the machine and on tools, with, in the worst case, irreparable damage as a consequence.

During the processing of metal materials, problems also arise that are caused by the high level of noise caused by vibrations from the processing and the noise of the machine. Tools that have been used up until the present have not had built-in or subsequently added damping arrangements of such a type that sufficient damping of sound and vibration has been possible. It is important to be able to remove major parts of the vibration noise within the frequency interval that is uncomfortable for the human ear. It is desirable that the level is reduced to a level under 80 dB.

The arrangement of a vibration-damping material in a longitudinal track on a tool holder is previously known through U.S. Pat. No. 2,426,359 A. The aim is to completely damp the vibrations, or at least to reduce them significantly.

A tool holder is previously known through WO 02/45892 A1 (FIG. 14) with a damping element. The distance between the damping element and the tool body is such that a relative motion between the tool body and the damping element is permitted during processing.

A tool holder for several tools is previously known through U.S. Pat. No. 5,033,340 A. An aperture is present in the connecting surface between each tool and the tool holder, and a "damping sandwich" construction is arranged in this aperture. This design consists of alternating layers of steel and viscoelastic material. It is considered that this design reduces noise.

Previous attempts to solve the problem of vibrations have thus contained complicated solutions with weights and fluids in cavities in the tool holder intended to oscillate with inverted phase relative to the undesired vibrations and in this way to cancel them out. Other solutions demonstrate material arranged on the surface of the tool holder intended in the same manner to oscillate with inverted phase for cancellation of the vibrations. These solutions in general involve troublesome dimensioning procedures and testing procedures before the correct material and properties are found, even if this is possible at all.

One aspect of the present invention is thus to achieve a tool holder with the conditions required to damp vibrations in a simpler manner.

BRIEF DESCRIPTION OF THE INVENTION

The present invention, therefore, demonstrates a shaft intended to be arranged in a tool holder in a manufacturing machine, a head on which a cutter is intended to be arranged and a vibration-damping material arranged such that the cutter is in contact with the manufacturing machine solely through the vibration-damping material where the vibration-damping material is a metal or an alloy of metals from the group comprising Cu, Ti, Zn, Al and Ni.

The tool holder is, in this way, not in direct contact with the manufacturing machine, and has thus the conditions required for damping vibrations, to a large extent.

It is particularly advantageous if the metal or the alloy is applied to the tool holder in the form of a surface covering with a thickness of between 1 μm and 100 μm.

It is an advantage if the surface covering comprises at least two layers.

According to the method according to the present invention, the surface covering is created by electrochemical pulse plating through the tool holder, when functioning as an electrode, being lowered into an electrolyte containing ions of at least one metal from the group comprising Cu, Ti, Zn, Al and Ni.

Other embodiments are made clear by the dependent claims that depend on the principal claim.

It has become apparent that reductions of 500 to 600% can be obtained with a tool holder according to the present invention, compared to a conventional tool holder.

DESCRIPTION OF EMBODIMENTS

Figure 1:
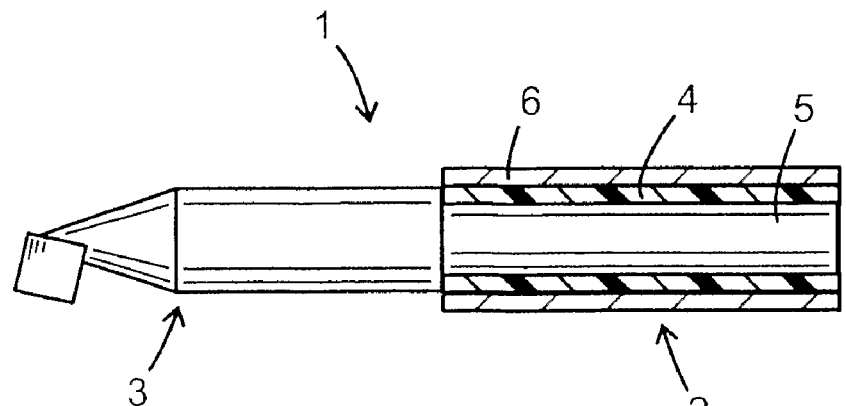
FIG. 1 shows a tool holder according to a first embodiment of the present invention.

With reference to FIG. 1, a first embodiment of the invention is constituted by a tool holder 1, consisting of a shaft 2 and a head 3. A cutter is intended to be arranged on the head 3. The shaft 2 of the tool holder 1 is provided with a vibration-damping material 4 around its surface 5. A non-compulsory iron tube 6 is arranged around the viscoelastic material 4 intended to distribute more evenly the mounting forces when the tool holder 1 is attached to a manufacturing machine.

Figure 2:
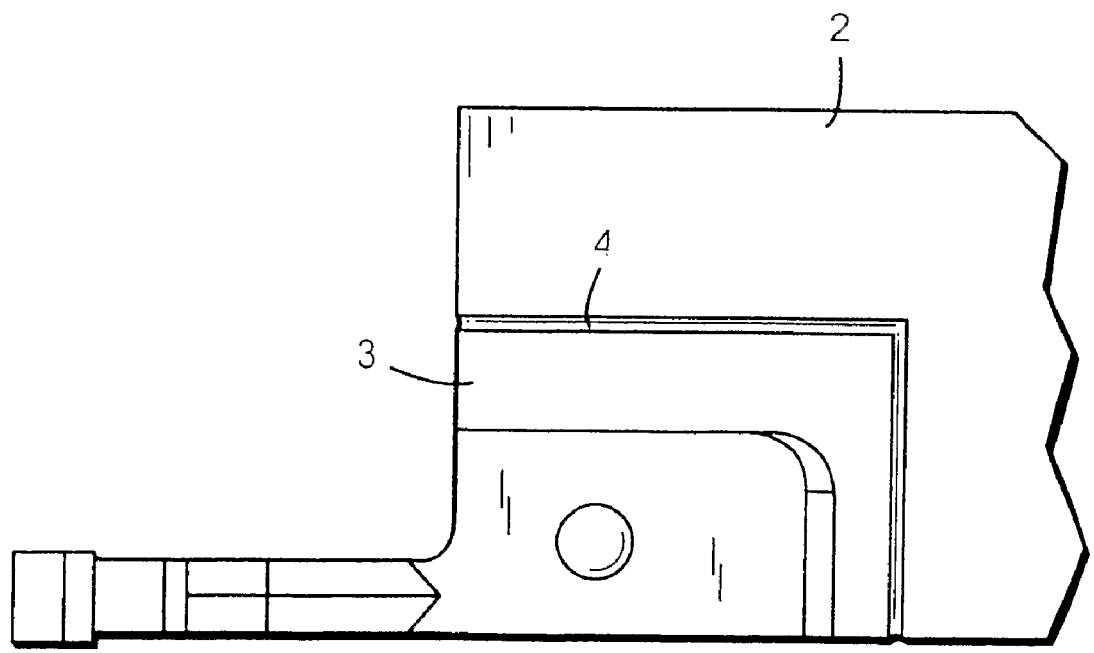
FIG. 2 shows a tool holder according to a second embodiment of the present invention.

With reference now to FIG. 2, a second embodiment of the invention is constituted by a tool holder 1. The tool holder 1 is physically divided into two parts, a forward head 3 intended to accommodate a cutter, and a rear shaft 2 intended to be mounted into a manufacturing machine. The shaft 2 and the head 3 are separated from each other by a vibration-damping material 4. The vibration-damping material 4 may be arranged at any location on the tool holder between the attachment of the cutter into the front end of the tool holder and the region intended for mounting into the manufacturing machine. It is preferable that the vibration-damping material 4 is arranged at the front end in the manner that is shown in FIG. 2.

The shaft 2 of the tool holder 1 is provided with a vibration-damping material in the form of a metal covering surface on the surface of the tool holder as shown in FIG. 1 or between the shaft 2 and the head 3 as shown in FIG. 2. Thus the vibration-damping material is a metal or an alloy of metals from the group comprising Cu, Ti, Zn, Al and Ni. Tests have shown that a thin covering with a thickness between 1 μm and 100 μm functions to damp vibrations that arise during mechanical processing. The test shows that there is a positive correlation between the damping capacity and the number of layers that make up the covering. Coverings containing up to 1,000 layers have been investigated in tests. However, it has been assumed that an increased damping effect can be obtained by further increasing the number of layers. The most suitable method for applying the layers to the tool holder or onto each other is currently the technique of pulse plating. This is based on the transmittance of current pulses through the substrate when it is immersed in the plating bath. The plating metal will then attach in an electrochemical process to the substrate, which in this case is the tool holder. Pulse plating can be used in one individual bath to create several layers. The properties of the layer can be changed by changing the properties of the pulses. It should be mentioned that good mechanical properties, such as the static rigidity and the modulus of elasticity, of the tool holder are obtained through the limited thickness of the covering.

Table 1 below shows the measurement results for a comparative investigation of several combinations of material, thicknesses and number of layers. The pulse durations that have been used lie between 0.1 second and 1 second. The pulse duration has a direct influence on the thickness of a layer.

TABLE 1

| Specimen | Number of layers | Calculated total thickness (μm) | Frequency (Hz) | Damping effect (%) |
| --- | --- | --- | --- | --- |
| 1 | 1000, Ni | 30 | 197 | 11.4 |
| 3 | 500, Ni | 3.5 | 202 | 7.8 |
| 6 | 200-300, Ni—Cu | 2-3 | 197 | 6.4 |
| 5 | 50, Ni | 3.5 | 194 | 1.5 |

It appears that the influence of the total thickness of the covering does not influence the damping effect to a significant degree, at least, it does not have by any means the same significance as the number of layers. The improved damping capacity with an increasing number of layers is primarily attributed to the loss of energy that arises in the interfaces between layers.

It has proved to be the case that if the shaft of the tool holder is provided with a cavity, preferably a drilled-out cylinder, the damping characteristics can be improved to a greater degree.

It should be realized that the complete tool holder may be covered with the vibration-damping material. This involves at least advantages associated with the technique of manufacturing the covering through pulse plating. Alternatively, it may be the case that the tool holder may be fully covered with the vibration-damping material with the exception of the surface of contact of the cutter or tool against it. There are indications that suggest that a certain further vibration damping effect may be achieved with these measures.

What is claimed is:

1. A tool holder for a cutter of a manufacturing machine for processing metal materials comprising:

a shaft intended to be arranged in the manufacturing machine for processing metal materials;
a head on which the cutter is intended to be arranged, the head being arranged on the shaft; and
a vibration-damping material arranged between the shaft and the head such that the head is in contact with the manufacturing machine solely via the vibration-damping material, wherein the vibration-damping material consists of a metal selected from the group consisting of Cu, Ti, Zn, Al and Ni or the vibration-damping material consists of an alloy of metals selected from the group consisting of Cu, Ti, Zn, Al and Ni, the metal or the alloy is in the form of a covering with a thickness that lies between 1 μm and 100 μm and the shaft and the head are two separate parts united through the vibration-damping material.

2. The tool holder according to claim 1, wherein the covering comprises at least two layers.

3. The tool holder according to claim 1, wherein the covering comprises at least 50 layers.

4. The tool holder according to claim 1, wherein the covering comprises at least 200 layers.

5. The tool holder according to claim 1, wherein the covering comprises at least 500 layers.

6. The tool holder according to claim 1, wherein the covering comprises at least 1,000 layers.

7. A method for manufacturing a tool holder for a cutter of a manufacturing machine for processing metal materials comprising the steps of:

providing a shaft intended to be arranged in the manufacturing machine for processing metal materials;
providing a head on which the cutter is intended to be arranged, the head being arranged on the shaft; and
providing a vibration-damping material arranged between the shaft and head such that the head is in contact with the manufacturing machine solely via the vibration-damping material, wherein the vibration-damping material consists of a metal selected from the group consisting of Cu, Ti, Zn, Al and Ni or the vibration-damping material consists of an alloy of metals selected from the group consisting of Cu, Ti, Zn, Al and Ni, the metal or the alloy is in the form of a covering with a thickness that lies between 1 μm and 100 μm and the shaft and the head are two separate parts united through the vibration-damping material.

8. The method for manufacturing according to claim 7, wherein the vibration-damping material is created by electrochemical pulse plating by the tool holder functioning as an electrode and being lowered into an electrolyte containing ions of at least one metal selected from the group consisting of Cu, Ti, Zn, Al and Ni.

9. The method according to claim 7, wherein the covering comprises at least two layers.

10. The method according to claim 7, wherein the covering comprises at least 50 layers.

11. The method according to claim 7, wherein the covering comprises at least 200 layers.

12. The method according to claim 7, wherein the covering comprises at least 500 layers.

13. The method according to claim 7, wherein the covering comprises at least 1,000 layers.

* * * * *